D. K. WILSON.
STEERING MECHANISM FOR CULTIVATORS.
APPLICATION FILED JUNE 18, 1920.

1,393,869.

Patented Oct. 18, 1921.
3 SHEETS—SHEET 3.

Inventor,
D. K. Wilson, by
G. C. Kennedy,
Attorney.

UNITED STATES PATENT OFFICE.

DALTON K. WILSON, OF WATERLOO, IOWA.

STEERING MECHANISM FOR CULTIVATORS.

1,393,869.  Specification of Letters Patent.  Patented Oct. 18, 1921.

Application filed June 18, 1920. Serial No. 389,886.

*To all whom it may concern:*

Be it known that I, DALTON K. WILSON, a citizen of the United States of America, and a resident of Waterloo, Blackhawk county, Iowa, have invented certain new and useful Improvements in Steering Mechanism for Cultivators, of which the following is a specification.

My invention relates to improvements in power-actuated riding cultivators, and the objects of my improvements are, first, to supply a cultivator of this class with convenient manually operable means for either jointly or separately steering it, and in controlling the implements therein; and second, to furnish pedal operated means, of which one set may be used in controlling a clutch-device included in the power-transmission mechanism, while the other set may be similarly operated in actuating a brake-device also included within power-transmission mechanism.

Figure 1:
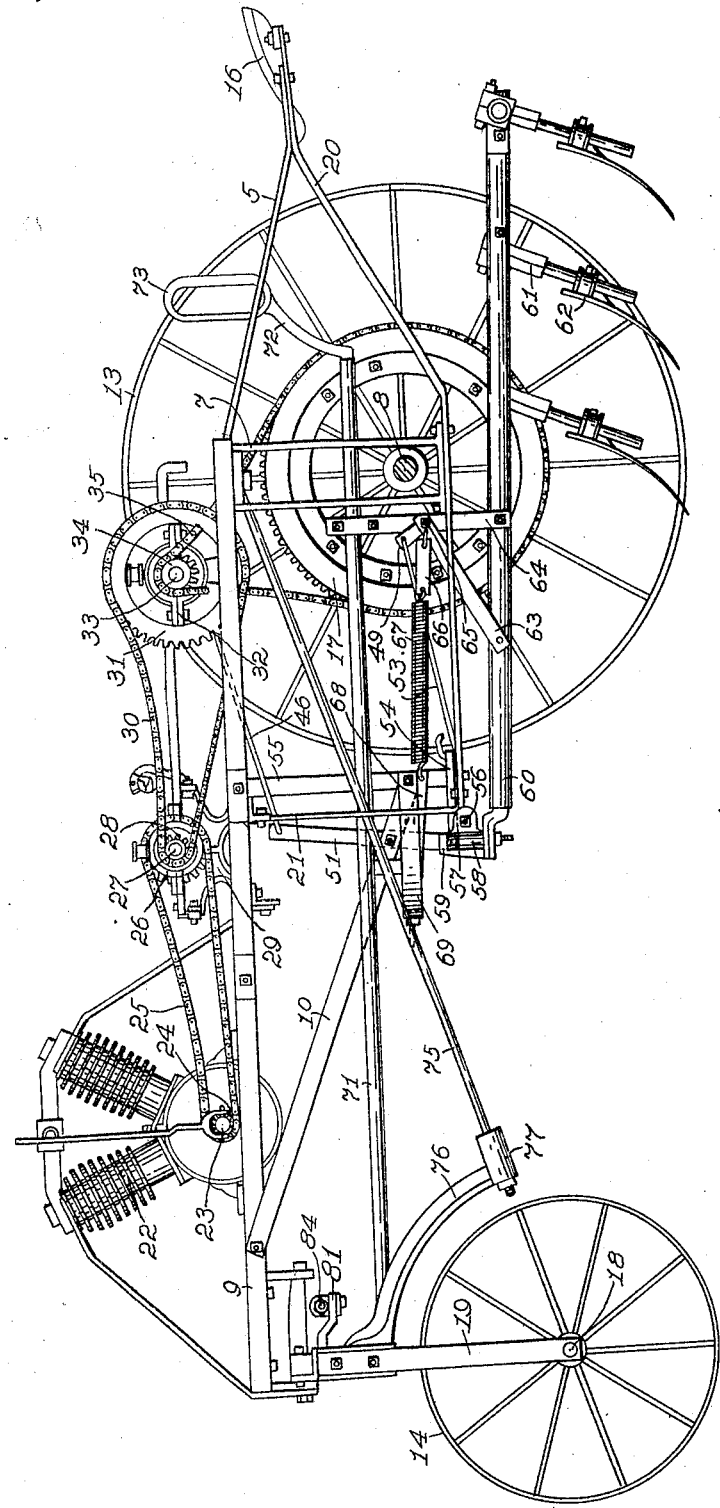
Figure 2:
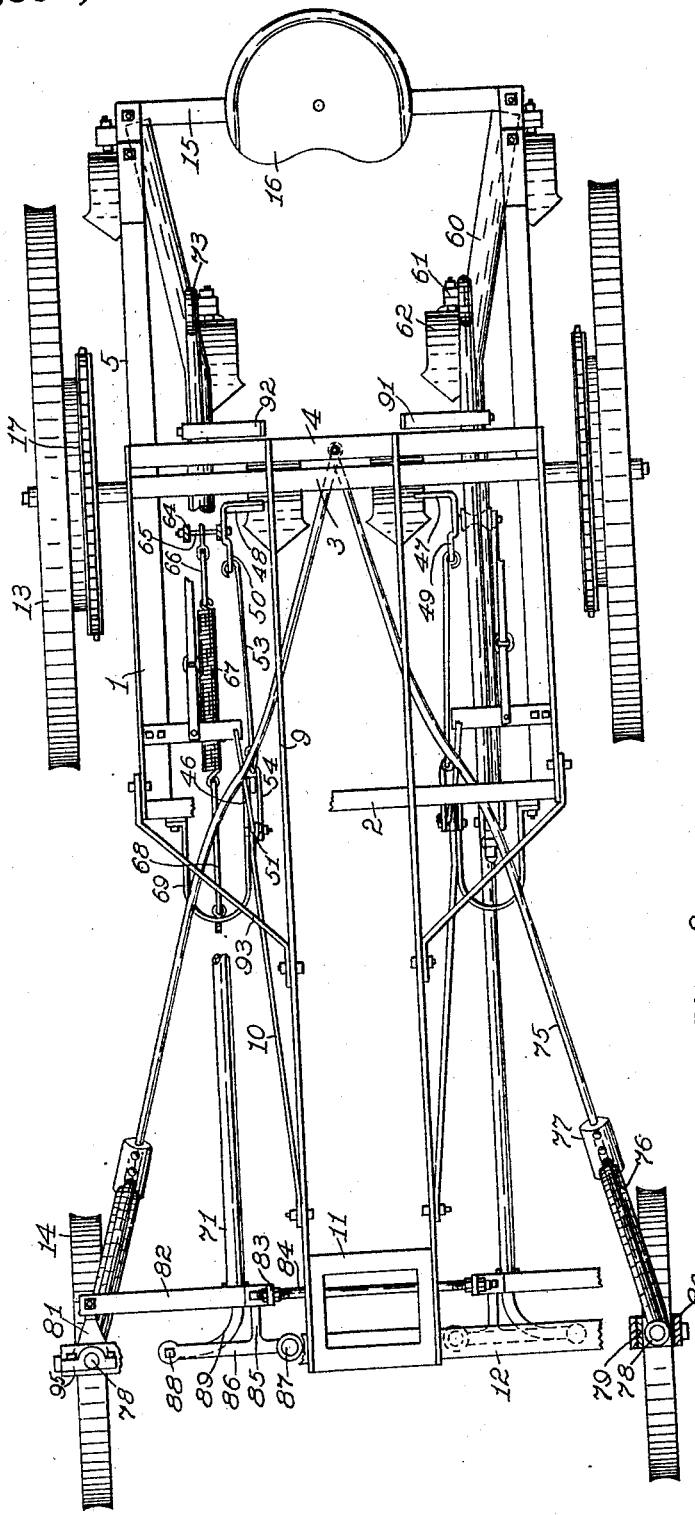
Figures 3, 4:
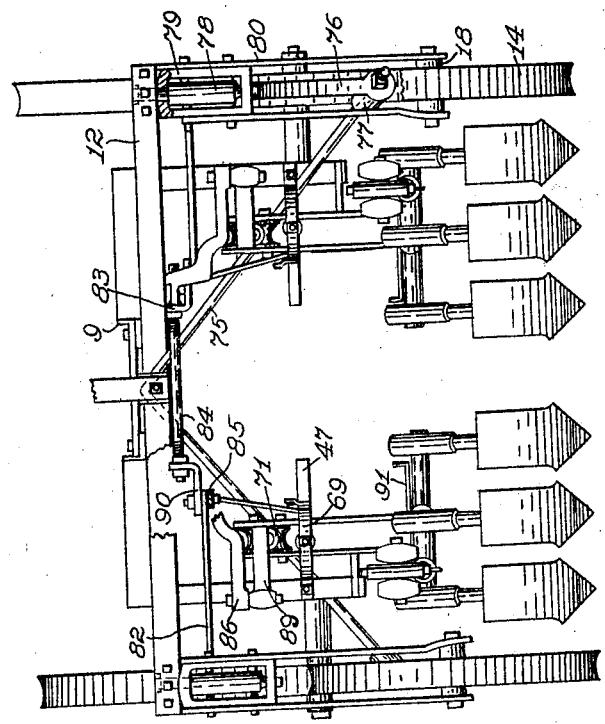

These objects have been successfully accomplished by the means and mechanisms which are hereinafter fully described and claimed, and which are illustrated in the accompanying drawings, in which Figure 1 is a side elevation of a power-actuated riding cultivator equipped with the improvements constituting my invention, parts being removed or broken away; Fig. 2 is a top plan of the same cultivator, with the motor and power-transmission mechanism removed, and other parts broken away, Fig. 3 is a rear elevation of the cultivator with the motor and other parts removed, and Fig. 4 is a front elevation of the cultivator with the motor and power-transmission mechanism removed and other parts broken away.

In said drawings, similar numerals of reference denote corresponding parts throughout the several views.

My improved power-actuated riding cultivator has a skeleton frame supplied with a pair of depending spaced hangers 7 carrying means (not shown) for fixedly mounting thereon outwardly-extending fixed axle-spindles 8 on which relatively large carrying-wheels 13 are rotatably mounted. As shown in Fig. 2, the frame may be composed of spaced longitudinal bars or beams 1 having rearward extensions 5, and the bars 1 may be fixedly connected by means of flat bars 2, 3 and 4, while the rear ends of the extensions 5 may be connected by means of a downwardly-bowed transverse bar 15 which carries a medial seat 16.

Between the longitudinal side-bars 1 are a pair of longitudinally arranged spaced bars 9 which terminate rearwardly with the rearmost cross-bar 4, but whose forward parts are extended forwardly of the bars 1 and are connected thereto by means of the converging brace-bars 93. The forward extremities of the bars 9 are fixedly connected by means of a hollow rectangular casting 11.

A pair of tubular gang-bars 60 are supported at their forward ends by universal-joints composed of the elements 56, 57, 58 and 59 connected to the lower ends of hangers 21 and 55, and the lower longitudinal side-bars 20 of the frame. It will be seen that these joints are such that the gang-bars, together with their shanks 61 and implements 62 may be shifted either laterally or up and down swingingly.

For the purpose of steering and to support the front end of the frame which carries the prime-motor 22, I have supplied a pair of steering-wheels 14, each being of the caster type, and which is controllable manually for the purpose of rocking them transversely to change the direction of the cultivator, by means which will be described hereinafter. Secured to the forward ends of the bars 9 is a transverse beam 12 having on its ends the bearing-blocks 95 which are vertically orificed to receive the fixed pintles 78 which extend upwardly from within hollow rock-bodies 79, the latter carrying the depending spaced hanger-bars 80, and the lower ends of the latter are orificed horizontally in alinement to seat the ends of the short shaft 18 of the wheel 14, rotatably. It will be seen, by referring to Fig. 2, that the rock-bodies have at their upper ends the rearwardly-projecting arms 81 for a purpose to be mentioned.

In order to brace and support this pintle-body 78 and the above described elements which rock thereon, I have mounted fixedly a downwardly and rearwardly curved bracket-arm 76 on said pintle-body, which is supplied at its lower extremity with an integral rearwardly-extending and inwardly inclined longitudinally orificed part 77, in whose hollow is secured the forward end of a long brace-rod 75. This brace-rod is inclined upwardly and inwardly as shown and its rear end secured to the rear part of the frame. These brace-rods afford support to the caster-wheels 14 in a direction radial thereto, and effect strong support for the pintle-bodies, as the rods may be adjusted by means of their adjusting terminal nuts to impose the proper strain.

Additional stiffness is imparted to the structure, by means of side-braces 10 which extend from the forward parts of the bars 9 downwardly and rearwardly and are secured to the lower parts of the hangers 55.

The steering-wheels 14 are rocked transversely for the purpose of changing the direction of movement of the cultivator, by the following means.

The numeral 82 denotes a pair of alined transverse bars whose outer ends are pivotally connected to the arms 81. On the inner and opposed ends of these bars are secured angle-plates having upturned parts 83, and the latter are orificed to receive the extremities of an adjusting connecting-rod 84. The ends of the rod 84 are threaded to receive adjusting-nuts, whereby the bars 82 may be adjusted to correctly position the arms 81 with the wheels 14. The numeral 86 denotes a pair of like alined bars whose inner ends are pivotally connected to the transverse frame-bar 12 by pintles 87. These bars 86 have integral rearwardly-projecting arms 85 which are pivotally connected to the bars 82. The outer ends of the bars 86 are pivotally connected at 88 to the outer extremities of outwardly-curved arms 89 whose rear extremities are fixed in the forward ends of tubular beams 71, the latter extending rearwardly beyond the frame cross-bars 4 and being supplied at their rear ends with upstanding arms 72 having integral looped handles 73. The rear parts of the beams 71 and their handles 73, both of which will be hereinafter referred to as controllers 71, are supported in the following manner.

The numeral 64 denotes a pair of upright bars, spaced laterally and whose lower ends span and are secured to the controller-beam 71 by a bolt, and are further braced and secured thereto by means of an inclined brace-bar 63. Between the tops of the upright bars 64 are rotatably mounted concave roll-ers 70 whose interspace is traversed by the associated controller-beam 71, and for which they serve as anti-friction elements for connecting the beam 71 to the said uprights and the gang-frame below, in a relatively loose or sliding manner. Midway, the upright-bars are connected by a transverse bolt 65, to which is loosely linked the rear end of a coiled tension-spring 67. This spring is directed horizontally forward and is linked to the rear end of a plate 68, whose forward end is formed with a threaded forward extension passed through an orifice in a forwardly-bowed element 69, and secured thereto by an adjusting-nut. The ends of the element 69 are fixedly secured to the hanger 55 and to the lower part of the brace-bar 10. It will be seen that this spring resiliently supports the uprights 64 with the gang-frame 60, as also the controller-beam 71 thereabove.

The cultivator is propelled by the prime-motor 22 by means of the following described transmission-mechanism.

On the crank-shaft 23 of the motor is a pinion 24 which carries the forward end of a sprocket-chain 25. On a casting 29 mounted on the frame is supported a change-speed device, which contains on its shaft 27 a sprocket-wheel 26, but whose components will not otherwise be described. This sprocket-wheel carries the rear end of the chain 25. On the same shaft is mounted a sprocket-pinion 28 which carries the forward end of a sprocket-chain 30.

In bearings 32 on said frame is supported a shaft-part 33 which carries a component gear-wheel (not shown) of a differential gearing in the casing 38, and operating also the alined shaft part 36, a clutch-member 37 being slidably non-rotatably mounted on said shaft-part adapted to be mated with a clutch-face on the adjacent element of the differential-gearing, a coiled spring 39 being engaged between said clutch-member and a fixed upright 74 to exert a compressive tension against the clutch-member.

A brake-drum 42 is fixed on said shaft-part 36 and is encompassed by a resilient band-brake 43, one end of the band-brake being fixed to the frame and the other end being pivotally connected to a rock-arm 44. A rock-arm 40 of the bell-crank lever type is pivotally connected to the said clutch-member 37, by which the latter may be shifted along the shaft-part 36.

In order to conveniently operate the said clutch-member, and also said band-brake, when necessary, I have provided the following described pedal-actuated elements.

On each gang-frame 60, at a proper distance in advance of the driver's seat 16, is fixed an inwardly-directed stirrup, as shown at 91 and 92, to receive the driver's feet. Above and a little forward of said stirrups pedals 47 are medially pivotally mounted on said transverse bolt 65 of the uprights 64, and the forward parts 49 and 50 of said pedals are pivotally connected to the rear ends of connecting-rods 53. The forward ends of the connecting-rods 53 are hooked to or pivoted to the rear ends of bars 54, whose forward ends are pivoted to the lower ends of rock-arms 51, which are medially pivoted to the inclined brace-bar 10. The numeral 46 denotes a connecting-rod whose forward end is pivotally connected to the upper end of the rock-arm 51, and whose other end is pivotally connected to an arm 96 fixed on the bell-crank lever 40. It will be seen, that when the pedal 47 is rocked by one foot of the driver, in a certain direction the above described connected elements will uncouple said clutch-member to disengage the power-transmission means from the driven shaft-parts. In like manner the foot of the driver is used to rock the other pedal 48, which thus moves a similar connecting-rod 52, the latter pivoted to a bar 44, which latter is pivotally connected to the otherwise free end of the band-brake 43. By this means the brand-brake can be operated as desired.

The power-transmission mechanism described is used to rotate the carrying-wheels 13 in the usual way. On the driven shaft-part 33 is fixed a sprocket-pinion 34 which carries a sprocket-chain 35, and the latter drives a sprocket-wheel 17 fixed concentrically upon the adjacent carrying-wheel 13. The other wheel 13 is driven similarly through the medium of said differential gearing.

The driver in the seat 16, can conveniently steer the cultivator by means of the controllers 71, using the handles 73 manually, and shifting the controllers back and forth longitudinally which is the natural and well-known manner of using devices, such as reins or lines in directing a team of draft-horses. In thus moving the handles 73 to and fro longitudinally there is no tendency to accidentally displace the gang-beams 60 transversely, as might be the case were the controllers mounted to be shifted laterally. A perfect and steady control may thus be maintained over the steering-gear.

The controllers may be used to lift or to shift transversely the gang-frames and implements as necessary from time to time. It will be observed that because of the loose or sliding connections of the controllers with the gang-frames, through the medium of the anti-friction rollers 70, the cultivator may have its direction changed at will without moving the gang-frames either up or down or sidewise. A result is the ability of the driver to steer steadily without the liability to displace the implements and yet having the ready convenience of shifting the implements as desired while simultaneously using the controllers in steering.

The use of the pedals to control the clutch and the band-brake also relieves the driver from the necessity of removing his hands from the controllers.

Having described my invention, what I claim as new, and desire to secure by Letters Patent, is:

1. In a device of the character described, carrying-wheels, dirigible steering-wheels, a main frame supported on said wheels, a gang-frame having at one end a universal-joint connection with said main frame, and a controller movably connected to said steering-wheels and loosely connected to said gang-frame and movable longitudinally to change the direction of travel of the steering-wheels independently of the gang-frame, or to be moved simultaneously longitudinally and in another direction to operate both the steering mechanism and the gang-frame.

2. In a device of the character described, carrying-wheels, dirigible steering-wheels, a main frame supported on both sets of wheels, a longitudinally-movable controller, adjustably-connected elements linked between said controller and said steering-wheels to rock the latter laterally only when the controller is shifted longitudinally, and implements slidably connected to the controller and movably connected to said main frame.

3. In a device of the character described, carrying-wheels, dirigible steering-wheels, a main-frame, implements movably connected to the main frame, direction-changing interlinked elements mounted on said main frame and operative on said steering-wheels to change their direction of travel, a member linked with said elements and movable longitudinally to actuate same, and means for suspending said implements on said member permitting certain movements to said member without changing the positions of the implements relative to the main frame.

4. In a device of the character described, a pair of independently-rotatable carrying-wheels, a pair of dirigible steering-wheels, a main frame supported on both pairs of wheels, implements movably connected to said main frame pintles fixed on said main frame, housings in which said steering-wheels are rotatably mounted, the housings being mounted to rock laterally on said pintles, downwardly-inclined bracket-members rigid with said pintles, and brace-rods positioned in line with a radius of each steering-wheel, having one end fixed to said main frame, with their other ends adjustably secured to the lower ends of said bracket-members.

5. In a device of the character described, independently-rotatable carrying-wheels, a main frame mounted on said carrying-wheels, a pair of gang-frames positioned side by side and suspended movably at their forward extremities from said main frame.

a pair of manually-operable longitudinally-movable controllers operatively connected movably with said gang-frames, steering-devices, and connections between said steering-devices and said controllers permitting the controllers to be employed either to change the direction of the steering-devices without moving the gang-frames, or while so changing the direction of the steering-devices to be used in simultaneously shifting the gang-frames in desired directions.

Signed at Waterloo, Iowa, this 21st day of May, 1920.

DALTON K. WILSON.